(12) United States Patent
Metge et al.

(10) Patent No.: US 11,060,732 B2
(45) Date of Patent: Jul. 13, 2021

(54) CONSTANT VOLUME COMBUSTION CHAMBER WITH COUNTER ROTATING SHUTTER VALVE

(71) Applicant: SAFRAN, Paris (FR)

(72) Inventors: Pierre Jean-Baptiste Metge, Moissy-Cramayel (FR); Matthieu Leyko, Moissy-Cramayel (FR)

(73) Assignee: SAFRAN, Paris (FR)

( * ) Notice: Subject to any disclaimer, the term of this patent is extended or adjusted under 35 U.S.C. 154(b) by 12 days.

(21) Appl. No.: 16/651,087

(22) PCT Filed: Sep. 13, 2018

(86) PCT No.: PCT/FR2018/052253
§ 371 (c)(1),
(2) Date: Mar. 26, 2020

(87) PCT Pub. No.: WO2019/063908
PCT Pub. Date: Apr. 4, 2019

(65) Prior Publication Data
US 2020/0224878 A1 Jul. 16, 2020

(30) Foreign Application Priority Data
Sep. 27, 2017 (FR) ...................... 1758971

(51) Int. Cl.
*F02C 5/12* (2006.01)
*F23R 7/00* (2006.01)
(Continued)

(52) U.S. Cl.
CPC ................. *F23R 7/00* (2013.01); *F02C 5/12* (2013.01); *F01L 7/06* (2013.01); *F02C 3/14* (2013.01);
(Continued)

(58) Field of Classification Search
CPC ...... F23R 7/00; F02C 5/02; F02C 5/12; F23C 15/00; F23C 2205/00; F23C 2205/20; F23C 2205/10
(Continued)

(56) References Cited

U.S. PATENT DOCUMENTS

| 2,515,644 | A | * | 7/1950 | Goddard | F02K 7/06 |
| | | | | | 60/224 |
| 2,640,314 | A | * | 6/1953 | Abel | F02K 7/06 |
| | | | | | 60/247 |
| 2,930,196 | A | * | 3/1960 | Hertzberg | F02K 7/06 |
| | | | | | 60/39.76 |
| 3,332,236 | A | * | 7/1967 | Kunsagi | F23C 15/00 |
| | | | | | 60/39.39 |

(Continued)

FOREIGN PATENT DOCUMENTS

| FR | 3 032 024 A1 | 7/2016 |
| WO | WO 91/10815 A1 | 7/1991 |
| WO | WO 2014/020275 A1 | 2/2014 |

OTHER PUBLICATIONS

International Search Report as issued in International Patent Application No. PCT/FR2018/052253, dated Nov. 14, 2018.

*Primary Examiner* — Lorne E Meade
(74) *Attorney, Agent, or Firm* — Pillsbury Winthrop Shaw Pittman LLP

(57) ABSTRACT

A constant volume combustion chamber for a turbine engine, includes an intake port, an exhaust port, and a first rotary shutter facing the intake and exhaust ports and configured to rotate around an axis in a first direction of rotation, the first shutter including an aperture intended to cooperate alternately with the intake and exhaust ports during the rotation of the first shutter. The chamber further includes at least one second rotary shutter facing the intake and exhaust ports and configured to rotate around the axis in a second direction of rotation opposite to the first direction, the second shutter including an aperture intended to cooperate alternately with the intake and exhaust ports during the rotation of the second shutter, the first and second shutters (Continued)

being synchronized and configured so that their respective apertures intersect alternately when both are facing the intake and when both are facing exhaust ports.

5 Claims, 1 Drawing Sheet

(51) Int. Cl.
  *F01L 7/06* (2006.01)
  *F02C 3/14* (2006.01)
  *F02C 5/02* (2006.01)

(52) U.S. Cl.
  CPC .......... *F02C 5/02* (2013.01); *F05D 2220/323* (2013.01); *F05D 2240/35* (2013.01)

(58) Field of Classification Search
  USPC ...................................... 60/39.76, 39.78, 247
  See application file for complete search history.

(56) References Cited

U.S. PATENT DOCUMENTS

| | | | | |
|---|---|---|---|---|
| 3,501,913 | A | * | 3/1970 | Brille ........................ F02C 5/12 60/39.15 |
| 3,650,105 | A | | 3/1972 | Toye |
| 5,353,588 | A | * | 10/1994 | Richard ..................... B01J 3/08 60/247 |
| 5,558,049 | A | | 9/1996 | Dubose |
| 5,901,550 | A | * | 5/1999 | Bussing .................... F23R 7/00 60/39.38 |
| 6,276,329 | B1 | * | 8/2001 | Archer ...................... F01C 3/02 123/228 |
| 6,349,538 | B1 | * | 2/2002 | Hunter, Jr. ................ F02K 7/06 60/204 |
| 6,439,503 | B1 | * | 8/2002 | Winfree ................... F02K 7/075 244/53 R |
| 6,931,833 | B2 | * | 8/2005 | Lupkes ..................... F02C 5/00 60/207 |
| 7,228,683 | B2 | * | 6/2007 | Henry ....................... F02C 5/02 60/204 |
| 9,512,805 | B2 | * | 12/2016 | Snyder ..................... F02C 5/12 |

\* cited by examiner

CONSTANT VOLUME COMBUSTION CHAMBER WITH COUNTER ROTATING SHUTTER VALVE

CROSS-REFERENCE TO RELATED APPLICATIONS

This application is the U.S. National Stage of PCT/FR2018/052253, filed Sep. 13, 2018, which in turn claims priority to French patent application number 1758971 filed Sep. 27, 2017. The content of these applications are incorporated herein by reference in their entireties.

BACKGROUND OF THE INVENTION

The present invention relates to the general field of combustion chambers for aircraft turbine engines, and more particularly to a constant volume combustion system comprising one or more combustion chamber(s).

The invention applies to all types of turbine engines, particularly to the turbojet engines, turboprops and turbomachines with unducted fans, also known under the name "Open Rotor".

A conventional aircraft turbine engine, or turbomachine, includes, in a known manner, one or more combustion chambers. Such a combustion chamber is supplied with pressurized air by a compressor module. The combustion chamber includes a fuel injector which is able to inject fuel into the taken air flow to burn it and thus cause the emission of hot gases. These hot gases can then be used to drive a turbine, which drives in turn the compressor module and which can also drive a fan of the turbine engine. The combustion chamber comprises at least one intake port through which air is introduced inside the chamber, and an exhaust port through which the hot gases are discharged outside the chamber.

In such a chamber, the fuel flow rate is generally continuous and the combustion conventionally operates according to a cycle called Brayton cycle, that is to say according to a constant pressure combustion or "CPC" cycle.

However, to obtain specific consumption gains, it has been envisaged to replace the combustion chamber operating according to a Brayton cycle by a plurality of combustion chambers operating according to a Humphrey cycle, that is to say according to a constant volume combustion or "CVC" cycle.

The constant volume combustion cycle comprises a combustion time (designated by the expression "combustion phase"), an exhaust time (designated by the expression "exhaust phase"), and a fresh air intake and flue gas sweeping time (designated by the expression "sweeping phase"). During the combustion phase, both intake and exhaust ports are closed. During the exhaust phase, the intake port is closed and the exhaust port is open. During the sweeping phase, the intake and exhaust ports are both open.

The combustion chamber is thus commonly provided with an intake and exhaust mechanism making it possible to monitor the opening and closing of the intake and exhaust ports in order to ensure the achievement of the three phases of the aforementioned cycle.

However, there is a need to simplify the existing mechanisms for the intake of air into the combustion chambers operating according to a constant volume combustion cycle.

OBJECT AND SUMMARY OF THE INVENTION

The object of the present invention is in particular to provide a constant volume combustion CVC system which does not have the aforementioned drawbacks.

To this end, the invention proposes a constant volume combustion chamber for a turbine engine, the combustion chamber comprising an intake port, an exhaust port, and a first rotary shutter facing the intake and exhaust ports and configured to rotate around an axis of rotation in a first direction of rotation, the first shutter comprising an aperture intended to cooperate alternately with the intake port and the exhaust port during the rotation of the first shutter.

According to a general characteristic of the invention, the combustion chamber further comprises at least one second rotary shutter facing the intake and exhaust ports and configured to rotate around said axis of rotation in a second direction of rotation opposite to the first direction of rotation, said second shutter comprising an aperture intended to cooperate alternately with the intake port and the exhaust port during the rotation of said at least one second shutter, said first and second shutters being synchronized and configured so that their respective apertures intersect a first time when both are facing the intake port and a second time when both are facing the exhaust port.

The combustion chamber with a rotating shutter thus allows controlling the opening and closing of the combustion chamber without contact and more efficiently than a combustion chamber with a simple rotary shutter.

The use of at least one second perforated shutter allows supplying the combustion chamber by improving the opening and closing speed.

In addition, the use of a superimposition of shutters allows lengthening the distance and making the path to be traveled more complex to the combustion gases to leak and thus improving the sealing of the combustion chamber.

The invention further allows achieving low pressure losses at the exhaust and obtaining a high reactivity between the opening and the closing of the intake and exhaust ports.

According to one aspect of the invention, the shutters can be made of ceramic matrix composite materials.

Another object of the invention proposes a constant volume combustion system for a turbine engine comprising at least one combustion chamber as defined above and at least one control unit configured to control the rotation of shutters of said at least one combustion chamber.

Another object of the invention proposes a turbine engine comprising an axial or centrifugal compressor and an axial or centripetal turbine, the turbine engine further comprising a combustion system as defined above, the combustion system being present between the compressor and the turbine.

Yet another object of the invention proposes an aircraft comprising at least one turboprop, the turboprop comprising a turbine engine.

BRIEF DESCRIPTION OF THE DRAWINGS

The invention will be better understood upon reading the following, for illustrative purposes but without limitation, with reference to the appended drawings wherein.

DETAILED DESCRIPTION OF EMBODIMENTS

Figure 1:
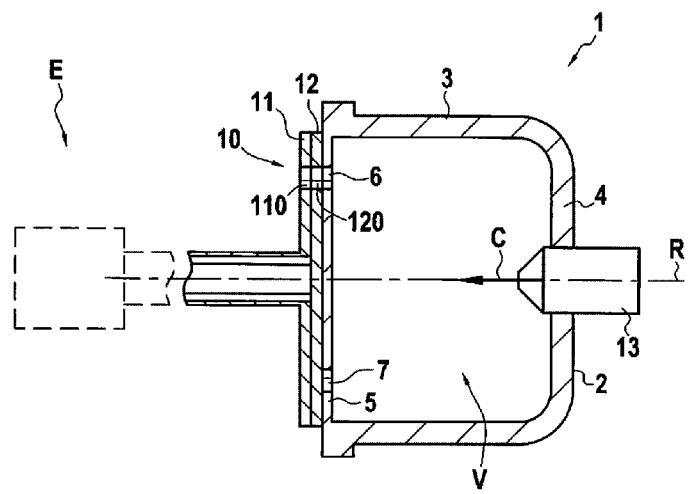
FIG. 1 schematically illustrates a sectional view of a combustion chamber which usable within the context of the invention.

The example illustrated in FIG. 1 relates to a combustion chamber in which the air intake valve 10 is in the form of two rotary shutters 11 and 12 whose axis of rotation R is fixed to a wall of the combustion chamber.

The combustion chamber 1 comprises an enclosure 2 which delimits an internal volume V. The internal volume V is delimited and surrounded by the enclosure 2. The enclosure 2 has here a substantially cylindrical shape. The enclosure 2 can, more generally, have a symmetrical shape of revolution. Other shapes can however be envisaged for the enclosure 2 such as a parallelepiped shape, for example.

FIG. 1 represents a sectional view along a plane comprising the axis of revolution of the combustion chamber 1 according to the invention, the axis of revolution of the chamber 1 being coincident with the axis of rotation R of the shutters 11 and 12.

The enclosure 2 comprises a circumferential wall 3 which is located around the internal volume V of the chamber 1. The enclosure 2 further comprises a first bottom 4 and a second bottom 5. The first bottom 4 and the second bottom 5 each delimit the internal volume V. The first bottom 4 and the second bottom 5 are located on either side of the circumferential wall 3.

The combustion chamber 1 is provided with a fuel injector 13 placed here on the first bottom 4. The combustion can be initiated in a known manner either by a spark igniter (spark plug) or by a gas thermal igniter (not represented).

In the example illustrated, the enclosure 3 defines an intake port 6 and an exhaust port 7, without however departing from the scope of the invention if the chamber comprised a plurality of intake ports and/or a plurality of exhaust ports. The intake port 6 and the exhaust port are here arranged through the second bottom 5. They could also be arranged through the circumferential wall 3.

In this example, each shutter 11 and 12 is made of CMC material, that is to say of a material comprising a fibrous reinforcement densified by an at least partially ceramic matrix. The enclosure 2 can also be made of CMC material or, alternatively, of metal material.

In a CMC material, the fibrous reinforcement may be made of carbon (C) fibers or of ceramic fibers, for example of silicon carbide (SiC) fibers. Fibers usable to constitute this fibrous reinforcement are produced by the Japanese company Nippon Carbon under the reference "Nicalon" or "Hi-Nicalon" or "Hi-Nicalon Type-S", or by the Japanese company Ube Industries under the reference "Tyranno-ZMI". The usable carbon fibers are, for example, provided under the name Torayca T300 3K by the company Toray. The fibers can be coated with a thin interphase layer made of pyrolytic carbon (PyC), boron nitride (BN) or boron doped carbon (BC, with 5% at. to 20% at. of B, the supplement being C). In a CMC material, the matrix is at least partially made of ceramic. The matrix can be composed of more than 50% by mass by a ceramic material. The matrix can consist of a ceramic material. The matrix can include at least one silicon carbide phase, for example. The matrix can be formed in a manner known per se by Chemical Vapor Infiltration or CVI. The matrix can also be at least partly formed by introduction of powders, in particular carbon and optionally ceramic powders, and infiltration by a metal composition based on silicon in the molten state, to form a SiC—Si type matrix. Such a process is well known and commonly designated by MI ("Melt Infiltration") process.

Figure 2:
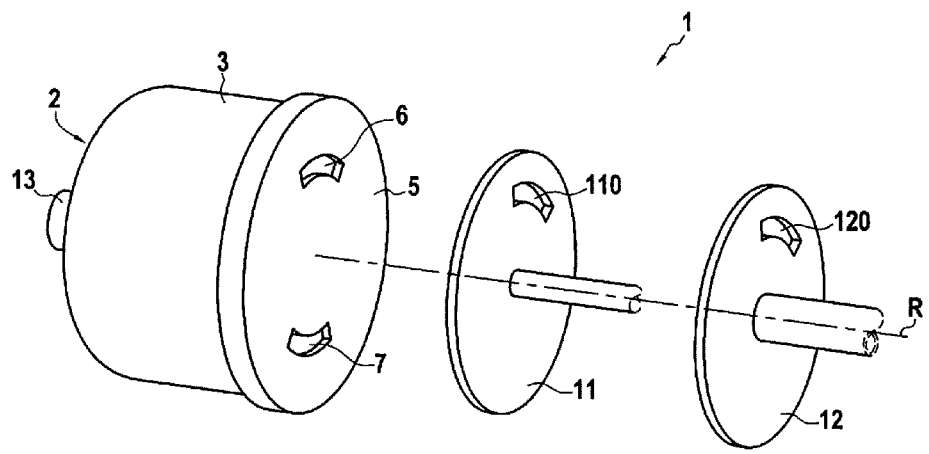
FIG. 2 presents a schematic view of a shutter of the combustion chamber of FIG. 1.

As illustrated in FIG. 2 which presents a schematic view of a shutter of the combustion chamber of FIG. 1, each shutter 11 and 12 has a disk shape with an aperture 110 and 120 having an arc shape. The aperture 110 and 120 of each shutter 11 and 12 is positioned on a circle of the same radius, that is to say at the same distance from the center of rotation of the shutter 11 and 12 so that the apertures 110 and 120 can overlap during the rotation of the shutters 11 and 12

During the operation of the combustion chamber, the shutters 11 and 12 are continuously rotating in opposite directions of rotation.

Before the start of the combustion, the shutters 11 and 12 are positioned so that the apertures 110 and 120 of the shutters 11 and 12 are aligned facing the intake port 6. Thus, the internal volume V is in communication with the outside E of the chamber 1 before initiation of the combustion allowing in particular the injection of air into the internal volume V of the combustion chamber 1. This communication is ensured by the intake port 6. The exhaust port 7 is, for its part, sealed by the shutters 11 and 12 before the start of the combustion. An example where there is a single exhaust port 7 has been illustrated, without however departing from the scope of the invention when the chamber 1 is provided with several exhaust ports 7.

The combustion is then initiated by fuel injection (arrow C) and ignition. The initiation of the combustion leads to increase the pressure in the internal volume V while the shutters continue to pivot until the intake port 6 is no longer open to the outside E, that is to say until none of the portions of the apertures 110 and 120 are facing a portion of the aperture of the other shutter.

When the combustion is finished, the exhaust port 7 is opened in order to discharge the flue gases outside the chamber 1. The exhaust port 7 is opened by the superimposition of the apertures 110 and 120 of the shutters 11 and 12 facing the exhaust port 7.

The combustion system which has just been described can be adapted to the gas supply to a turbine engine. The gases generated by the combustion system can allow supplying a turbine, such as an aircraft engine turbine.

The invention provides a combustion system with simplified mechanisms for the intake and exhaust of air into the combustion chambers operating according to a constant volume combustion cycle.

The invention claimed is:
1. A constant volume combustion chamber for a turbine engine, the constant volume combustion chamber comprising:
   an intake port;
   an exhaust port;
   a first rotary shutter facing the intake and exhaust ports, the first rotary shutter configured to rotate around an axis of rotation in a first direction of rotation, the first rotary shutter comprising an aperture configured to cooperate alternately with the intake port and the exhaust port during the rotation of the first rotary shutter; and
   at least one second rotary shutter facing the intake and exhaust ports, the at least one second rotary shutter configured to rotate around said axis of rotation in a second direction of rotation opposite to the first direction of rotation, said at least one second rotary shutter comprising an aperture configured to cooperate alternately with the intake port and the exhaust port during the rotation of said at least one second rotary shutter, said first rotary shutter and said at least one second rotary shutter being synchronized and configured so that their respective apertures intersect a first time when both apertures are facing the intake port to allow the injection of air into the constant volume combustion chamber through both apertures and a second time when both apertures are facing the exhaust port to allow the discharge of flue gases out of the constant volume combustion chamber through both apertures.

2. The combustion chamber according to claim 1, wherein the rotary shutters are made of ceramic matrix composite materials.

3. A constant volume combustion system for the turbine engine comprising at least one combustion chamber according to claim 1.

4. The turbine engine further comprising an axial or centrifugal compressor and an axial or centripetal turbine, the turbine engine further comprising the constant volume combustion system according to claim 3, the constant volume combustion system being present between the compressor and the turbine.

5. An aircraft comprising at least one turboprop, the at least one turboprop comprising the turbine engine according to claim 4.

* * * * *